May 26, 1959　　　E. J. HAMMER ET AL　　　2,888,081
BEET HARVESTER EJECTION DEVICE

Filed Nov. 22, 1957　　　　　　　　　　3 Sheets-Sheet 1

INVENTOR.
Ervin J. Hammer,
BY Orrin H. Hammer
McMorrow, Berman + Davidson
ATTORNEYS May 26, 1959   E. J. HAMMER ET AL   2,888,081
BEET HARVESTER EJECTION DEVICE
Filed Nov. 22, 1957   3 Sheets-Sheet 2
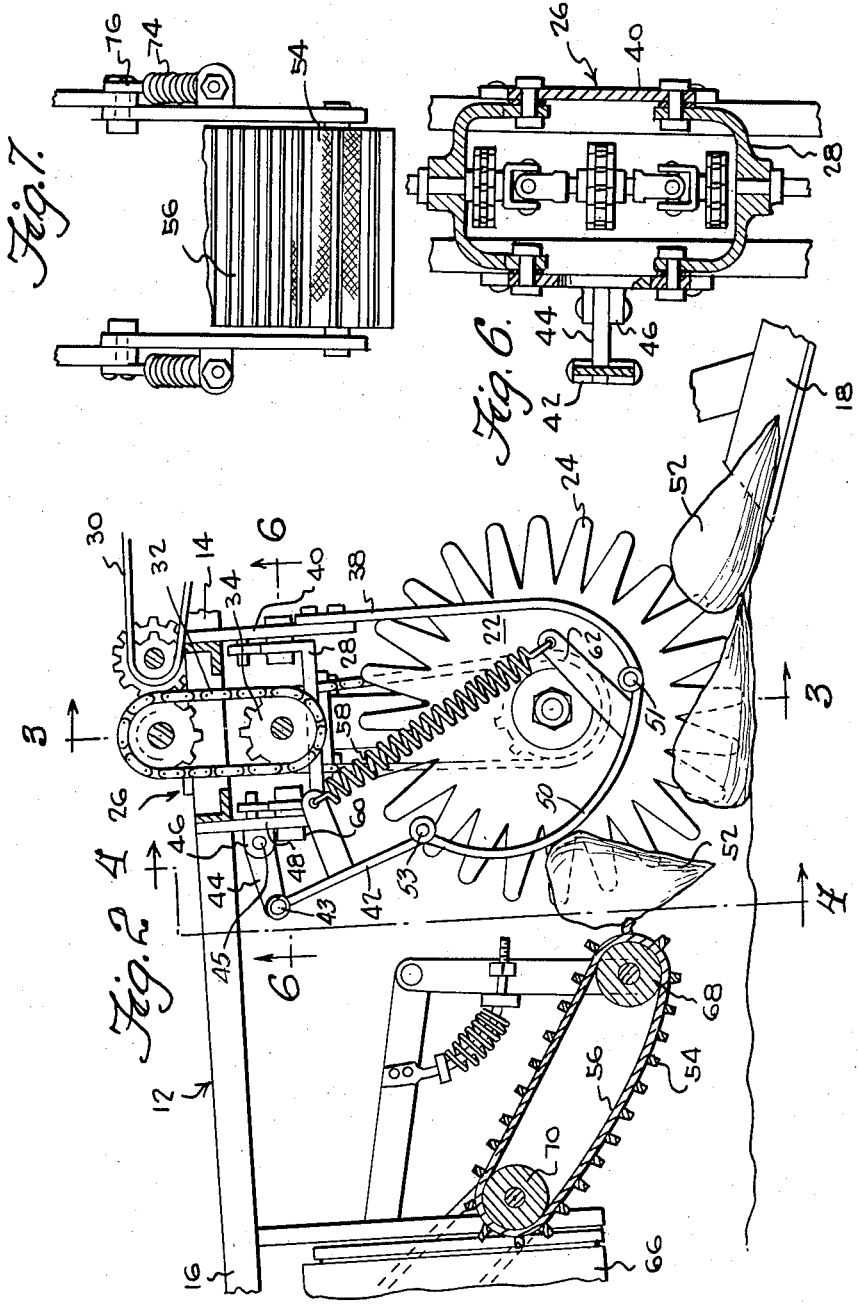
INVENTORS
Ervin J. Hammer,
BY Orrin H. Hammer,
McMorrow, Berman & Davidson
ATTORNEYS

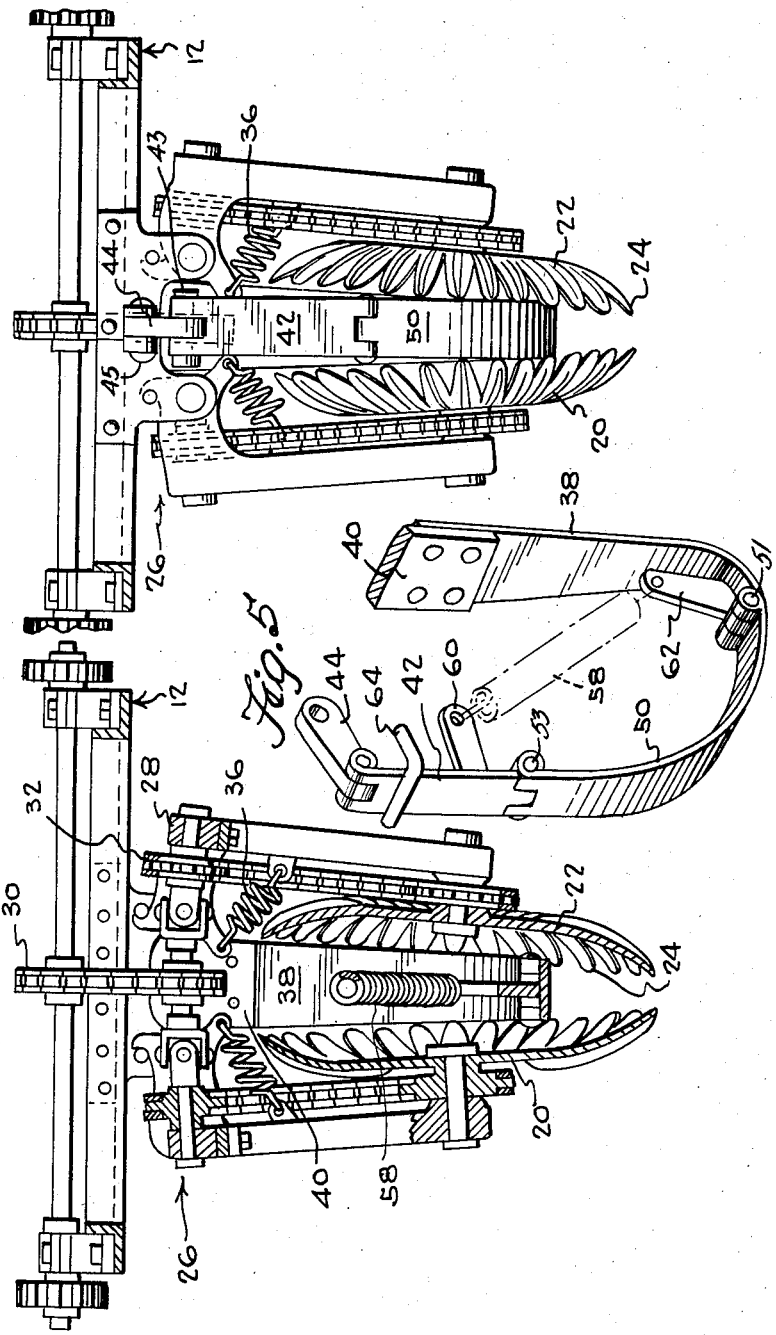

United States Patent Office 2,888,081
Patented May 26, 1959

2,888,081

BEET HARVESTER EJECTION DEVICE

Ervin J. Hammer, Miller City, and Orrin H. Hammer, Fostoria, Ohio

Application November 22, 1957, Serial No. 698,120

3 Claims. (Cl. 171—58)

The present invention relates to a beet harvester in which ejection means is provided.

An object of the present invention is to provide a beet harvester in which means is associated with the fingers for ejecting the beets held by the fingers.

Another object of the present invention is to provide an ejection means in a beet harvester of the type having finger wheels which lends itself to efficient operation, one which is easily attached to a beet harvester and requires little or no attention, and one which is highly effective in action.

Another object of the present invention is to provide an ejection device for a beet harvester of the type having finger wheels for pulling the beets from the ground which is of simple structure, one sturdy in construction and one which is economically feasible.

These and other objects and advantages of the present invention will be fully apparent from the following description when taken in connection with the annexed drawings in which:

Figure 2 is a fragmentary sectional view, similar to Figure 1, showing the action of the finger wheels pulling beets from the ground and the action of the ejection device of the present invention ejecting the beets from the wheel;

Figure 3 is a sectional view taken on the line 3—3 of Figure 2;

Figure 4 is a sectional view taken on the line 4—4 of Figure 2;

Figure 5 is an isometric view of the ejection device of the present invention removed from the finger wheels;

Figure 6 is a sectional view taken on the line 6—6 of Figure 2; and

Figure 7 is an elevational view of the conveyor means with parts broken away.

Figure 1:
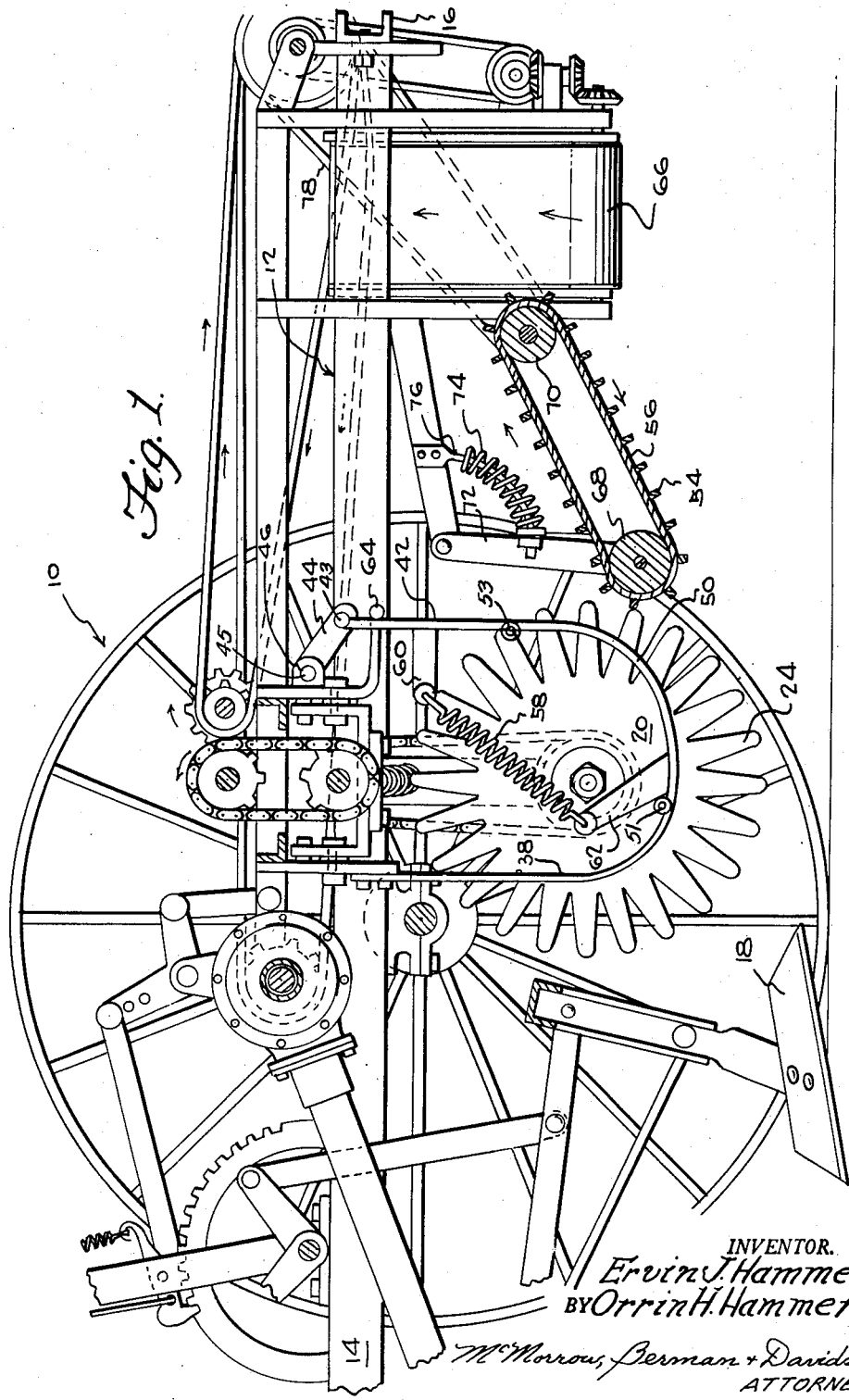
Figure 1 is a sectional view of the central portion of a beet harvester taken on a longitudinal center line, showing the ejection device of the present invention installed therein.

Referring in greater detail to the drawings in which like numerals indicate like parts throughout the several views, the reference numeral 10 designates the beet harvester in which the ejection device of the present invention is installed. The reference numeral 12 designates the mobile frame of the harvester 10. The forward end of the frame 12 is broken away with a portion adjacent the forward end designated by the reference numeral 14. The rearward end of the frame 12 is designated by the reference numeral 16. Beneath the forward end 14 and the frame 12 is a suitable beet topping device (not shown) followed by a lifting plow 18 dependingly carried by the frame 12. Following the plow 18, which is of conventional construction, are a pair of wheels 20 and 22 each having a plurality of spaced fingers 24 extending about and projecting from the periphery thereof. The wheels 20 and 22 are arranged in confronting spaced relation and extend in a downwardly converging direction.

The wheels 20, 22, are dependingly carried beneath the frame 12 on a supporting structure 26 including hanger members 28 (Figure 6) rockable about horizontal axes so that the wheels are movable toward and away from each other. The wheels 20 and 22 are driven in the same direction and at the same rate of speed by drive means including chains 30 and 32 and appropriately located sprocket gears as at 34 in Figure 2.

In Figures 3 and 4 the numeral 36 designates springs which bias the wheels 20 and 22 toward each other and resiliently permit their movement away from each other.

The ejection device or means of the present invention for ejecting a beet from the fingers 24 as the beet is carried upwardly by the wheels 20 and 22 is positioned in the space between the wheels 20 and 22 and, as seen most clearly in Figure 5, comprises a first upstanding bar 38 positioned in the space between the wheels 20 and 22 so that it lies within the adjacent peripheral portions of the wheels contiguous to the forward end of the frame 12 with the lower end of the bar 38 adjacent to and spaced inwardly from the converging peripheral portions of the wheels 20 and 22. The supporting structure 26 includes a forward vertical plate member 40 constituting means dependingly securing the upper end portion of the bar 38 to the frame 12.

A second bar 42 is positioned contiguous to the rearward end of the frame 12 and in spaced cooperating relation with respect to the bar 38. Means, embodying a link element 44, connects the upper end of the bar 42 to the frame 12 for limited up and down movement about a first horizontal axis or pin 43 which pivotally connects the upper end of the bar 42 to one end of the link element 44. The other end of the link element 44 is pivotally connected by a pin 45 to a bracket 46 which projects rearwardly from the rearmost plate member 48 of the supporting structure 26.

A bowed connecting member 50 extends from the lower end of the bar 38 to the lower end of the bar 42 and has the one end adjacent the lower end of the bar 38 connected to the bar 38 for swinging movement about a fixed second horizontal axis or pin 51 and has the other end adjacent the lower end of the bar 42 connected to the bar 42 for hinged movement about a third horizontal axis or pin 53 which is movable toward and away from the bar 38. In Figure 1 the normal position of the bar 42 is shown depending vertically from the free end of the link element 44 and in Figure 2 the bar 42 is shown pressed inwardly toward the bar 38 by a beet 52 which has been picked up between the fingers 24 of the wheels 20 and 22 and carried rearwardly into abutting engagement with prongs 54 arranged transversely of a conveyor 56.

Spring means is provided operatively connected to the bar 42 and the connecting member 50 for urging the pin 53, or third horizontal axis, of the bar 42 to the adjacent end of the connecting member 50 away from the bar 38. Specifically, this spring means consists in a coil spring under tension extending between the bar 42 and the connecting member 50. The spring is designated by the reference numeral 58 and is shown in Figures 1 and 2 to have one end connected to the free end of an arm 60 which projects from the intermediate portion of the bar 42 on the face thereof facing the bar 38. The other end of the spring 58 is connected to the free end of an arm 62 which projects upwardly from th connecting member 50 at a point adjacent to and inwardly of the point of connection of the connecting member 50 with the lower end of the bar 38. A stop 64 projects from the plate member 48 and engages the bar 42 to limit its outward movement away from the bar 38.

The harvester 10 also includes a conventional conveyor 66 (Figure 1) which receives the beets 52 from the conveyor 56 and carries the beets 52 upwardly and to one side of the harvester 10 into an appropriately disposed receptacle either carried by the harvester 10 or mounted on wheels of its own and traveling with the harvester 10. The conveyor 56 carrying the rigid prongs 54 about rollers 68 and 70 receives the beets 52 from the fingers 24 as the wheels 20 and 22 revolve with the prongs 54 removing from the beets most of the dirt carried thereby. The lower roller 68 is carried on the free end of an arm 72 biased forwardly by means of a coil spring 74 carried on an arcuately curved rod 76. The resilient mounting of the arm 72 keeps the conveyor 56 under normal tension until it is pressed rearwardly by a beet 52 held between the fingers 24 and engaged by the adjacent outer face of the connecting member 50 as the beet 52 is carried upwardly. The conveyor 56 is preferably driven at the same rate of speed as the speed of travel of the fingers 24, there being provided suitable drive means such as chains or belts 78 connecting the conveyor 56 to the conveyor 66 and to the conventional source of power in the harvester 10.

In operation, the lifting plow or plows 18 loosen the beets 52 in the soil and the fingers 24 on the wheels 20 and 22 embracingly grasp the beets 52 in succession and carry them upwardly and to the rear to a point where they engage the adjacent portion of the connecting member 50 and are ejected from the fingers 24 onto the upper flight of the belt or conveyor 56 for movement thereover to the point of discharge above the conveyor 66 from where they are carried to a suitable receptacle. The engagement of the beets 52 by the prongs 54 on the conveyor 56 serve to remove from the beets 52 most of the accumulated dirt, discharging the dirt before the beets are carried to the conveyor 66.

While only a preferred embodiment of the present invention has been shown and described, other embodiments are contemplated and numerous changes and modifications may be made therein without departing from the spirit of the invention as set forth in the appended claims.

What is claimed is:

1. In a beet harvester including a mobile frame having a forward end and a rearward end, and a pair of rotatable wheels each having a plurality of spaced fingers extending about and projecting from the periphery thereof arranged in confronting spaced relation and extending in a downwardly converging direction positioned below said frame and connected to said frame for resilient movement toward and away from each other, the fingers of said wheels being adapted to take hold of a beet and carry it rearwardly to a point of discharge, the improvement consisting in means for ejecting at the point of discharge the beet held by said fingers, said means comprising a first upstanding bar positioned in the space between said wheels so that it lies within the adjacent peripheral portions of said wheels contiguous to the forward end of said frame with the lower end adjacent to and spaced inwardly from the converging peripheral portions of said wheels, means dependingly securing the upper end of said bar to said frame, a second bar positioned contiguous to the rearward end of said frame and in spaced cooperating relation with respect to said first bar, means connecting the upper end of said second bar to said frame for limited up and down movement about a fixed first horizontal axis, and a bowed connecting member extending from the lower end of said first bar to the lower end of said second bar and having the one end adjacent the lower end of said first bar connected to said first bar for swinging movement about a fixed second horizontal axis and having the other end adjacent the lower end of said second bar connected to said second bar for hinged movement about a third horizontal axis movable toward and away from said first bar, said connecting member engaging a beet when held between the fingers of said wheels to eject the beet from said fingers at the point of discharge.

2. In a beet harvester including a mobile frame having a forward end and a rearward end, and a pair of rotatable wheels each having a plurality of spaced fingers extending about and projecting from the periphery thereof arranged in confronting spaced relation and extending in a downwardly converging direction positioned below said frame and connected to said frame for resilient movement toward and away from each other, the fingers of said wheels being adapted to take hold of a beet and carry it rearwardly to a point of discharge, the improvement consisting in means for ejecting at the point of discharge the beet held by said fingers, said means comprising a first upstanding bar positioned in the space between said wheels so that it lies within the adjacent peripheral portions of said wheels contiguous to the forward end of said frame with the lower end adjacent to and spaced inwardly from the converging peripheral portions of said wheels, means dependingly securing the upper end of said bar to said frame, a second bar positioned contiguous to the rearward end of said frame and in spaced cooperating relation with respect to said first bar, means connecting the upper end of said second bar to said frame for limited up and down movement about a fixed first horizontal axis, a bowed connecting member extending from the lower end of said first bar to the lower end of said second bar and having the one end adjacent the lower end of said first bar connected to said first bar for swinging movement about a fixed second horizontal axis and having the other end adjacent the lower end of said second bar connected to said second bar for hinged movement about a third horizontal axis movable toward and away from said first bar, said connecting member engaging a beet when held between the fingers of said wheels to eject the beet from said fingers at the point of discharge, and spring means operatively connected to said second bar and said connecting member for urging said third horizontal axis away from said first bar.

3. In a beet harvester including a mobile frame having a forward end and a rearward end, and a pair of rotatable wheels each having a plurality of spaced fingers extending about and projecting from the periphery thereof arranged in confronting spaced relation and extending in a downwardly converging direction positioned below said frame and connected to said frame for resilient movement toward and away from each other, the fingers of said wheels being adapted to take hold of a beet and carry it rearwardly to a point of discharge, the improvement consisting in means for ejecting at the point of discharge the beet held by said fingers, said means comprising a first upstanding bar positioned in the space between said wheels so that it lies within the adjacent peripheral portions of said wheels contiguous to the forward end of said frame with the lower end adjacent to and spaced inwardly from the converging peripheral portions of said wheels, means dependingly securing the upper end of said bar to said frame, a second bar positioned contiguous to the rearward end of said frame and in spaced cooperating relation with respect to said first bar, a link element positioned adjacent the upper end of said second bar and having one end connected to said frame for swinging movement of said element about a fixed first horizontal axis and having the other end connected to the upper end of said second bar for swinging movement of said second bar toward and away from said first bar, and a bowed connecting member extending from the lower end of said first bar to the lower end of said second bar and having the one end adjacent the lower end of said first bar connected to said first bar for swinging movement about a fixed second horizontal axis and having the other end adjacent the lower end of said second bar connected to said second bar for hinged movement about a third horizontal axis movable toward and away from said first bar, said connecting member resiliently engaging a beet when held between the fingers of said wheels to eject the beet from said fingers at the point of discharge.

References Cited in the file of this patent

UNITED STATES PATENTS

| | | |
|---|---|---|
| 528,869 | Wauthier | Nov. 6, 1894 |
| 1,620,019 | Hammer et al. | Mar. 8, 1927 |